Sept. 15, 1964   A. OSSENBRUNNER ETAL   3,148,986
SUBBED POLYCARBONATE FILM BASE PHOTOGRAPHIC ARTICLE
Filed Feb. 3, 1961
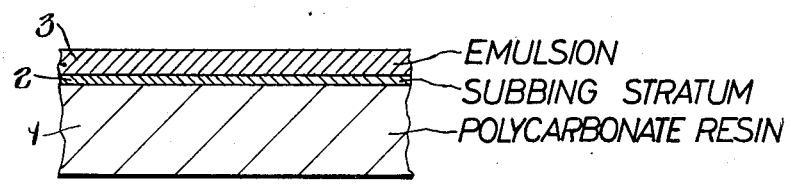
INVENTORS:
ARMIN OSSENBRUNNER, HERMANN SCHNELL, HELFRIED KLOCKGETHER,
JULIUS GEIGER, JOACHIM FREIER.
BY
Connolly and Hutz
ATTORNEY

United States Patent Office 3,148,986
Patented Sept. 15, 1964

3,148,986
SUBBED POLYCARBONATE FILM BASE
PHOTOGRAPHIC ARTICLE
Armin Ossenbrunner, Leverkusen, Hermann Schnell, Krefeld-Uerdingen, Helfried Klockgether and Julius Geiger, Leverkusen, and Joachim Freier, Krefeld-Uerdingen, Germany, assignors to Agfa Aktiengesellschaft, Leverkusen, Germany, a corporation of Germany
Filed Feb. 3, 1961, Ser. No. 86,972
Claims priority, application Germany Aug. 14, 1955
10 Claims. (Cl. 96—87)

Various plastics have already been recommended as layer supports for photographic materials, but only a few of them have proved satisfactory, since comparatively high standards are required of the photographic layer supports, for example, as regards their mechanical properties. Even the known replacement of the readily inflammable nitrocellulose by the nonflammable cellulose acetate must be accepted with certain disadvantages. The most serious of these are the substantially greater sensitivity to water of cellulose acetate and the inferiority of its mechanical properties. The first disadvantage is mainly apparent with those types of films with which it is necessary to attach value to maximum dimensional stability (accuracy of size), that is to say particularly with films which are used in the reproduction art.

Despite great improvements as regards the mechanical properties which could be produced with cellulose acetate, the quality of the nitrocellulose film has always still not quite been reached, this being particularly noticeable in a shorter effective life of the positive cinematographic films.

Attempts have already been made to utilize the many developments of novel plastics in the field of photographic film supports. In particular, two types of plastics exist with which certain improvements have been produced in this respect. Copolymers of vinyl chloride with other components, for example maleic acid esters, have been used as a support which maintains its dimensions, these copolymers being known under various names. These plastics cannot be considered for films with high mechanical values. The main disadvantages of these foils are that it is only with very great difficulty that they can be produced in long rolls and in a uniform quality with a highly glazed surface, and it is only with difficulty that they can be provided with a bonding layer which will guarantee a sufficient bonding of the light-sensitive layer.

This is particularly the case because the foils, which per se already soften in the region of 80° C. take up solvents when the bonding layers are applied and these solvents lower still further the softening point, so that it is only with very great difficulty that it is possible to dry the foils sufficiently, this being a pre-requisite if the dimensions are to be satisfactorily maintained.

Another plastic which is suitable as a film support on account of its mechanical properties as well as on account of its water-repelling properties, is the polyester of terephthalic acid and glycol. The excellent properties of this foil are, however, counteracted by very great difficulties in manufacture, particularly caused by the high melt viscosity and the great tendency of this plastic to crystallize. In the same way as all films which are not manufactured by the casting process this material also has the defects of non-uniform thickness, its more or less matte or uneven surface and also incomplete cleanliness, which is particularly important with photographic film.

It has now been found that foils of polycarbonates of bis(monohydroxyaryl)alkanes are excellently suitable as layer supports for photographic materials of the type referred to.

Such polycarbonates correspond to the general formula:

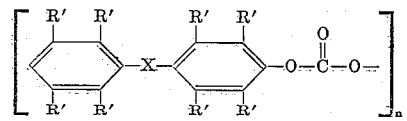

wherein X is selected from the group consisting of

and

each R being selected from the group consisting of hydrogen, unbranched and branched monovalent aliphatic hydrocarbon radicals containing up to 10 carbon atoms, monovalent cycloaliphatic radicals, monovalent araliphatic hydrocarbon radicals having up to 4 carbon atoms as side-chains, the phenyl and the furyl radical, Z represents the carbon and hydrogen atoms completing a cycloaliphatic ring, each R' represents a member of the group consisting of hydrogen, monovalent unbranched and branched aliphatic hydrocarbon radicals containing up to 5 carbon atoms, monovalent cycloaliphatic and aromatic hydrocarbon radicals, and $n$ represents a number greater than 20, preferably a number greater than 50.

Although such resins are referred to herein simply as polycarbonates or as polycarbonates of di or bis(monohydroxyaryl)alkanes, they are, to be more specific, as the formula specifies, polymers of di(monohydroxyaryl)alkane carbonates and will be referred to as such and by other more specific terms such as poly(2,2-bis(4-hydroxyphenyl)propane carbonate) in the claims.

Preferred polycarbonates are those in which each R' is hydrogen and each R is aliphatic or cycloaliphatic hydrocarbon radicals of the kind mentioned above, each of which may be the same or different members of the group mentioned above, for instance, an aliphatic or cycloaliphatic hydrocarbon radical.

Examples of polycarbonates according to the invention are those having the foregoing formula, in which each radical designated R and R' are hydrogen, further those in which one R is hydrogen and the other R is the methyl, the ethyl, the propyl, the isopropyl, the butyl, the isobutyl, the amyl, the hexyl, the heptyl, the octyl, the nonyl, the decyl, the 1-methyl-1-butenyl, the 1-ethyl-1-pentenyl, the cyclopentyl, the cyclohexyl, the benzyl, the 4-methylphenyl, 4-ethylphenyl, 4-propylphenyl, 4-isopropylphenyl, and 4-butylphenyl, the phenyl and the furyl radical, and all radicals designated R' are hydrogen, also those in which each R is one of these hydrocarbon radicals which may be identical or different hydrocarbon radicals, and all radicals designated R' are hydrogen, in which X is

Z representing the carbon atoms completing the cyclopentane or the cyclohexane ring and R' is hydrogen, and such, in which each R represents a hydrogen atom or the same or a different member of the groups mentioned above and each R' represents a member of the group consisting of the methyl, the ethyl, the propyl, the isopropyl, the n-butyl, the tert.butyl, the isobutyl, the tert.amyl, the cyclopentyl, the cyclohexyl, and the phenyl group.

Typical examples of polycarbonates for use in accordance with the invention are the polymers of 2,2-bis(4-hydroxyphenyl)propane carbonate, 2,2-bis(4-hydroxyphenyl)butane carbonate, 2,2 - bis(4 - hydroxyphenyl)pentane carbonate, 1,1-bis(4-hydroxyphenyl)cyclohexane carbonate, and mixed 2,2-bis(4-hydroxyphenyl)propane carbonate and bis(4-hydroxyphenyl)methane carbonate.

Such polycarbonates can be prepared, for example, by reacting substantially equimolar amounts of the corresponding di-monohydroxyaryl alkanes with bis-chlorocarboxylic acid esters of di-monohydroxyaryl alkanes with phosgene or with carbonic acid diesters, for example, according to the process of Belgian Patent No. 532,543 and of United States patent application Serial No. 557,256, filed January 4, 1956, in the name of H. Schnell, L. Bottenbruch, H. Krimm. The dihydroxy compounds in these processes are di-(monohydroxy-aryl)-alkanes of the generic formula:

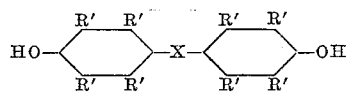

wherein X and R' represent the same atoms or groups as in the first formula. The two phenolic radicals may be the same or different.

Suitable di-(monohydroxy-aryl)-alkanes are for example:

4,4'-dihydroxy-diphenyl-methane,
1,1-(4,4'-dihydroxy-diphenyl)-ethane,
1,1-(4,4'-dihydroxy-diphenyl)-propane,
1,1-(4,4'-dihydroxy-diphenyl)-butane,
1,1-(4,4'-dihydroxy-diphenyl)-2-methyl-propane,
1,1-(4,4'-dihydroxy-diphenyl)-heptane,
1,1-(4,4'-dihydroxy-diphenyl)-1-phenyl-methane,
(4,4'-dihydroxy-diphenyl)-(4-methyl-phenyl)-methane,
(4,4'-dihydroxy-diphenyl)-(4-ethyl-phenyl)-methane,
(4,4'-dihydroxy-diphenyl)-(4-isopropyl-phenyl)-methane,
(4,4'-dihydroxy-diphenyl)-(4-butyl-phenyl)-methane,
(4,4'-dihydroxy-diphenyl)-benzyl-methane,
(4,4'-dihydroxy-diphenyl)-α-furyl-methane,
2,2-(4,4'-dihydroxy-diphenyl)-propane,
2,2-(4,4'-dihydroxy-diphenyl)-butane,
2,2-(4,4'-dihydroxy-diphenyl)-pentane (melting point: 149–150° C.),
2,2-(4,4'-dihydroxy-diphenyl)-4-methyl-pentane,
2,2-(4,4'-dihydroxy-diphenyl)-heptane (boiling point: 198–200° C. under 0.3 mm. mercury gauge),
2,2-(4,4'-dihydroxy-diphenyl)-octane,
2,2-(4,4'-dihydroxy-diphenyl)-nonane (melting point: 68° C.),
1,1-(4,4'-dihydroxy-diphenyl)-1-phenyl-ethane,
(4,4-dihydroxy-diphenyl)-1-(α-furyl)-ethane,
3,3-(4,4'-dihydroxy-diphenyl)-pentane,
4,4-(4,4'-dihydroxy-diphenyl)-heptane,
1,1-(4,4'-dihydroxy-diphenyl)-cyclopentane,
1,1-(4,4'-dihydroxy-diphenyl)-cyclohexane,
2,2-(4,4'-dihydroxy-diphenyl)-decahydronaphthalene (melting point: 181° C.),
2,2-(4,4'-dihydroxy-3,3'-dicyclohexyl-diphenyl)-propane (melting point: 144–146° C.),
2,2-(4,4'-dihydroxy-3-methyl-diphenyl)-propane (melting point: 114° C.),
2,2-(4,4'-dihydroxy-3-isopropyl-diphenyl)-butane,
1,1-(4,4'-dihydroxy-3,3'-dimethyl-diphenyl)-cyclohexane,
2,2-(4,4'-dihydroxy-3,3'-dibutyl-diphenyl)-propane,
2,2-(4,4'-dihydroxy-3,3'-diphenyl-diphenyl)-propane,
2,2-(4,4'-dihydroxy-2,2'-dimethyl-diphenyl)-propane,
1,1-(4,4'-dihydroxy-3,3'-dimethyl-6,6'-dibutyl-diphenyl)-butane,
1,1-(4,4'-dihydroxy-3,3'-dimethyl-6,6'-di-tert.butyldiphenyl)-ethane,
1,1-(4,4'-dihydroxy-3,3'-dimethyl-6,6-di-tert.butyldiphenyl)-propane,
1,1-(4,4'-dihydroxy-3,3'-dimethyl-6,6'-di-tert.butyldiphenyl)-butane,
1,1-(4,4'-dihydroxy-3,3'-dimethyl-6,6'-di-tert.butyldiphenyl)-isobutane,
1,1-(4,4'-dihydroxy-3,3'-dimethyl-6,6'-di-tert.butyldiphenyl)-heptane,
1,1-(4,4'-dihydroxy-3,3'-dimethyl-6,6'-di-tert.butyldiphenyl)-1-phenyl-methane,
1,1-(4,4'-dihydroxy-3,3'-dimethyl-6,6'-di-tert.butyldiphenyl)-2-methyl-pentane,
1,1-(4,4'-dihydroxy-3,3'-dimethyl-6,6'-di-tert.butyldiphenyl)-2-ethyl-hexane, and
1,1-(4,4'-dihydroxy-3,3'-dimethyl-6,6'-di-tert.amyldiphenyl)-butane.

For the formation of the polycarbonates, it is also possible to use mixtures of various di-monohydroxyaryl alkanes as well as mixtures of di-monohydroxyarylalkanes with 10–100 mol percent of other dihydroxy compounds, such as aliphatic, cycloaliphatic dihydroxy compounds as well as aromatic dihydroxy-compounds which are different from those mentioned above.

As examples of the accompanying dihydroxy compounds which may be used according to the invention, the following are named by way of example.

Aliphatic dihydroxy compounds such as: ethylene glycol, diethylene glycol, triethylene glycol, polyethylene glycol, thiodiglycol, ethylene dithiodiglycol, the di- and polyglycols produced from propyleneoxide-1,2, ortho, meta, or paraxylylene glycol, propanediol-1,3, butanediol-1,3, butanediol-1,4, 2-methylpropanediol-1,3, pentanediol-1,5, 2-ethyl propanediol-1,3, hexanediol-1,6, octanediol-1,8, 1-ethylhexanediol-1,3, and decanediol-1,10, cycloaliphatic dihydroxy compounds such as cyclohexanediol-1,4, cyclohexanediol-1,2, 2,2-(4,4' - dihydroxydicyclohexyl)-propane and 2,6-dihydroxydecahydronaphthalene and aromatic dihydroxy compounds such as hydroquinone, resorcinol, pyrocatechol, 4,4'-dihydroxydiphenyl, 2,2'-dihydroxy-diphenyl, 1,4 - dihydroxy-naphthalene, 1,6-dihydroxynaphthalene, 2,6 - dihydroxynaphthalene, 1,2 - dihydroxynaphthalene, 1,5-dihydroxy-naphthalene, dihydroxyanthracene, 2,2'-dihydroxy-dinaphthyl-1,1'- and o, m, and p-hydroxybenzylalcohol.

These mixed polycarbonates can be produced in the same way as the simple polycarbonates, that is to say: mixtures of the aforesaid di-monohydroxyaryl alkanes with other dihydroxy compounds of the type mentioned above can be reacted with derivatives of the carbonic acid selected from the group consisting of carbonic diesters, especially diarylesters, phosgene and bischlorocarbonic acid esters of dihydroxy compounds.

Thus the mixtures of the dihydroxy compounds can be reesterified with carbonic acid diesters, e.g. with the dimethyl-, diethyl-, dipropyl-, dibutyl-, diamyl-, dioctyl-, dicyclohexyl-, and especially with the diphenyl- and di-o, m, or p-tolyl carbonates, or with mixed esters, for instance, with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-tolyl, ethyl-m-tolyl, or ethyl-p-tolyl and the cyclohexylphenyl carbonate, particularly at elevated temperatures from about 50–330° C. and especially from about 120 to about 290° C. and under reduced pressure, for instance, up to 0.1 mm. mercury gauge.

By reesterifying the mentioned carbonic acid diesters, the corresponding alkyl or cycloalkyl alcohols or the corresponding phenols are split off.

The reesterifying process has to be carried out while excluding oxygen. We prefer to pass an inert gas, such as hydrogen, nitrogen, or carbon dioxide gas through the melt.

The reesterification may be activated by reesterifying catalysts, such as inorganic bases, for example, caustic soda and potassium hydroxide, high boiling organic bases, such as acridine, metal hydrides, such as lithium and calcium hydride, alkali or alkaline earth metals, such as sodium, potassium, magnesium and calcium, metal oxides, such as zinc oxide, aluminum oxide, lead oxide, antimony trioxide, cerium oxide, and boron oxide, acids, such as phosphoric acid and p-toluene sulphonic acid, and salts, such as sodium benzoate, calcium acetate, and boron phosphate, and alcoholates and phenolates.

The polycarbonates can also be produced by introducing phosgene into solutions of mixtures of the aforesaid dihydroxy compounds in organic bases, such as dimethylaniline, diethylaniline, trimethylamine, and pyridine, or in inert organic solvents, such as petrol, ligroin, cyclohexane, methyl cyclohexane, benzene, toluene, xylene, chloroform, methylenechloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chloro-carbonates of di-monohydroxyaryl alkanes, optionally mixed with such of the aforementioned other dihydroxy compounds, optionally also with mixtures of such other dihydroxy compounds and with di-monohydroxyaryl alkanes. The condensation proceeds suitably in the presence of inert solvents, and acid-binding materials, e.g. tertiary amines.

When using phosgene or bis-chlorocarbonic acid esters as derivatives of the carbonic acid in producing polycarbonates according to the invention catalysts also may be advantageous. Such catalysts are, for instance, tertiary or quaternary organic bases or salts thereof, such as trimethylamine, triethylamine, dimethylaniline, diethylaniline, dimethyl-cyclohexylamine, and pyridine, or for instance the corresponding hydrochlorides, and tetramethylammoniumhydroxide, triethyloctadecylammoniumchloride, trimethyl-benzylammoniumfluoride, triethylbenzylammoniumchloride, dimethyldodecylammoniumchloride, dimethylbenzylphenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Further in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, also act as such surface active agents.

In the production of polycarbonates according to the various processes it further is advantageous to employ small amounts of reducing agents, for example sodium or potassium sulphide, sulphite, and dithionite, or free phenol and p-tert. butyl-phenol.

By adding monofunctional compounds which are capable of reacting with phosgene or with the end groups of the polycarbonates consisting of the chlorocarbonic acid ester group and which terminate the chains, such as the phenols, for instance, phenol, tert. butylphenol, cyclohexylphenol, and 2,2-(4-hydroxyphenyl-4'-methoxyphenyl)-propane, further aniline and methylaniline, it is possible to regulate the molecular weight of the polycarbonates in wide limits. See in this connection U.S. patent application Serial No. 527,802, filed March 21, 1956, now abandoned.

Suitable polycarbonates are obtained for example from 4,4'-dihydroxydiphenyl-methylethyl methane or from 4,4'-dihydroxy-diphenyl dimethyl methane or from a mixture of 95% of 4,4'-dihydroxydiphenyl-dimethyl methane and 5% of 4,4'-dihydroxydiphenyl methane or from 90% of 4,4'-dihydroxy-diphenyl-dimethyl methane and 10% of 4,4'-dihydroxydiphenyl-1,1-cyclohexane.

Foils produced from the said polycarbonates are characterized by properties which make them suitable for all types of photographic film supports. The tensile strength thereof, even in the unstretched condition, is practically equal to that of acetate cellulose film. The extensibility and impact strength are even substantially higher. By stretching, it is possible to produce breaking loads which, with good extensibility and impact strength, approach those of terephthalic acid polyesters. In addition, it is particularly to be noted that these good mechanical properties are also maintained in the unstretched condition, even when subjected for a relatively long time to temperatures up to approximately 160° C. Thus, after being kept at 140° C. in the air for six weeks, it was still not possible to detect any decrease in the mechanical properties. Another important feature is the excellent stability with respect to the action of light, even ultraviolet radiation, air and moisture. The absorption of water is extraordinarily low (0.5% and lower), so that the films maintain their size particularly well, even in the wet state.

Since the polycarbonates of the invention also dissolve well in a series of solvents, such as chlorinated aliphatic hydrocarbons and aromatic hydrocarbons (e.g. benzene, xylene, toluene), methylenechloride, chloroform, esters, such as alkylacetates, ketones, such as acetone, or in mixtures of such solvents, the foils can be manufactured by the conventional casting method on a belt or drum machine, the advantages of this method, namely the production of a uniform thickness and optical clarity in transmission and on the surface, being fully obtained. The thoroughly dry raw material may be dissolved in a vessel provided with stirrer mechanism, preferably a high-speed stirrer, for example in a solvent having a low boiling temperature such as methylene chloride, to a solution having a viscosity of approximately 50,000 centipoises. It is also possible to add small amounts of higher boiling solvents (such as chloroform, propyl acetate and butyl acetate), these not necessarily having to be good solvents for the plastic. The addition of small amounts of plasticizers, such as tricresyl phosphate, is also advisable, depending on the quality which is required. After the air has been removed, the solution is cast on a casting machine according to the thickness required and also with the speed customary for cellulose acetate foils. If necessary, the polyesters to be used according to the invention can also be processed to films from the melt in a known manner. Dyestuffs or pigments can of course also be added to the solutions or melts of the polycarbonates prior to the shaping thereof.

Before the light-sensitive layers, especially silver halide emulsion layers or photographic auxiliary layers containing gelatin or other water-permeable colloids as binding agents, are applied to the layer support, the latter is generally provided with suitable bonding or subbing layers which can be prepared by various methods, examples of which are given below.

Prior to the application of hydrophilic colloid layers to the layer support, the latter is treated with a subbing solution containing the following normally solid film-forming agents:

(1) A mixed acetal of a polyvinyl alcohol with aldehydes containing water-solubilizing groups and aldehydes devoid of water-solubilizing groups, said mixed acetal being soluble in organic solvents and being capable of swelling to a high degree in water, and (2) A partially saponified copolymer of vinyl chloride and an ester of vinyl alcohol with a carboxylic acid.

With this synthetic resin layer the aforementioned films can be directly prepared without an additional intermediate layer. The use of an intermediate layer between film support and anchoring layer may be desirable in some cases for producing a good bonding effect. For the production of these intermediate layers, vinyl chloride copolymers, for examples, vinyl chloride-vinyl acetate copolymers, have proved satisfactory.

The mixed acetals found to be suitable are made by a method usual for the preparation of acetals, for example by the components being heated for several hours in methanolic solution with sulphuric acid as catalyst. Examples of aldehydes with water-solubilizing groups are aromatic aldehydes substituted in the aromatic nucleus with carboxyl-, sulfonic acid or hydroxy groups, preferably sulfonic acid groups, such as the sodium salt of benzaldehyde-2-sulphonic acid, the sodium salt of benzaldehyde-2,4-disulphonic acid; examples of aldehydes devoid of water-solubilizing groups are aliphatic, araliphatic and aromatic aldehydes, such as benzaldehyde, tolyl aldehyde, p-chlorobenzaldehyde, hydrocinnamic aldehyde, butyraldehyde.

For the bonding effect which is to be achieved it is of decisive importance that both the hydrophilic and the hydrophobic aldehydes are used for the preparation of the acetals. The degree of acetalization can be varied within wide limits, but the best results are obtained with products in which 50–70% of all hydroxyl groups of the polyvinyl alcohol are acetalized. The most favorable molar ratio between aldehydes with water-solubilizing groups and those without water-solubilizing groups naturally depends on the nature of the aldehydes and may vary between 1:1 and 1:4. We have found, however, that generally a molar excess of aldehyde without water-solubilizing groups is suitable for producing a sufficient degree of solubility in organic solvents. The acetals are preferably applied in the form of their water-soluble salts, for example in the form of their alkali-metal salts, such as sodium or potassium salts.

The partially saponified copolymer of vinyl chloride and organic vinyl ester are produced from copolymers of vinyl chloride and an organic vinyl ester, such as vinyl acetate, vinyl propionate, vinyl butyrate or an $\alpha,\beta$-ethylenically unsaturated organic acid, vinyl acetate being preferred. These partially saponified copolymers are prepared by known methods by saponification in methanolic solution with sulphuric acid as catalyst, only the organic ester groups being partially saponified. Suitable saponified copolymers contain about 45–70 percent by weight of vinyl alcohol, and 10–40 percent by weight of vinyl chloride, 5 to 30 percent by weight of vinyl acetate. The above partially saponified copolymers are preferably applied in amounts of 0.2 to 1 part by weight per 1 part by weight of mixed acetal. For producing a suitable coating solution the mixed acetal and the partially saponified copolymer may be dissolved together in a mixture of methanol, and one or more other organic solvents, such as acetone, tetrahydrofurane or dioxane, the concentration being adjusted between about 0.5 and 3 percent, preferably 1 to 2 percent by weight. The coating is preferably carried out by using one of the conventional dipping methods and by evaporating the solvents, preferably at elevated temperatures.

Furthermore, the layer support can also be provided with a thin intermediate subbing layer of polyvinyl chloride copolymers and nitrocellulose or organic cellulose esters, an additional thin intermediate layer of cellulose esters super-imposed thereon and a thin gelatin-containing layer as third layer.

The vinyl chloride copolymer of the first layer is preferably a copolymer of about 40–70 parts by weight of vinyl chloride with about 30–60 parts by weight of copolymerizable components selected from the group consisting of lower alkyl esters of ethylenically unsaturated carboxylic acids and vinyl esters of lower fatty acids, such as methyl-, ethyl-, propyl-, butyl-esters of acrylic acid, methacrylic acid, crotonic acid, maleic acid, furthermore, vinyl acetate, vinyl propionate, vinyl butyrate. Suitable organic cellulose esters are, for instance, mixed esters of cellulose with acetic acid and fatty acids having 3 to 4 carbon atoms, such as cellulose acetopropionate and cellulose acetobutyrate. For the production of the first layer the cellulose esters are preferably applied in quantities amounting to 30–70 percent by weight calculated on the total amount of polymers and cellulose esters.

For the initial treatment of the layer support, it is also possible to use a subbing layer consisting essentially of gelatin, an acid, and a partially hydrolyzed copolymer of about 40 to 60 parts by weight of vinyl chloride and about 60 to 40 parts by weight of vinyl acetate, said partially hydrolyzed copolymer preferably containing 45–70 percent by weight of vinyl chloride, 5 to 30 percent by weight of vinyl alcohol and 10 to 40 percent by weight of vinyl acetate. Suitable acids are organic acids, preferably carboxylic acids such as salicylic and phthalic acid which are applied in such amounts that the pH value of the coating solution is about 2 to 5, preferably 3 to 4, this being generally achieved by using the acids in amounts of 20 to 40 percent as calculated on the weight of gelatin. The proportion of gelatin to partially hydrolyzed copolymer may vary within wide limits although proportions of 10 parts by weight of gelatin to 3 to 15 parts by weight of copolymer are preferred. Furthermore, hardening agents for gelatin may be incorporated in said subbing layers such as formaldehyde, glyoxal, mucochloric acid (known also as 2,3-dichloro-3-formylacrylic acid, whose formula is $O=CH-CCl=CCl-COOH$) in amounts of about 2 to 20 percent as calculated on the weight of gelatin. The aforementioned components are dissolved in the customary organic solvents and the solutions are applied to the support by using one of the conventional dipping methods.

Other suitable subbing layers consist for example of nitrocellulose and an epoxide resin, above which is placed a second layer of gelatin. Another layer of nitrocellulose can also be applied between the nitrocellulose epoxide resin layer and the gelatin layer. Such epoxide resins are preferred which are obtained by reaction of epichlorohydrin with the di-monohydroxyaryl alkanes used for the manufacture of the polycarbonates of the film support (compare "Modern Plastics" (1954), page 242 et seq.). Instead of the epoxide resin in the base layer it is also possible to use a polycarbonate ester of a di-monohydroxyaryl alkane, again in admixture with nitrocellulose. The usual coating devices can be used for the application of the intermediate layers.

EXAMPLE 1

100 kg. of 4,4'-dihydroxydiphenyl-dimethyl methane polycarbonate are dissolved in 600 kg. of methylene chloride. The solution is filtered, deaerated by heating at 50° C., and thereafter it is cast to form a clear film with a thickness of 0.1 mm. Three layers are applied to both sides of the film in a suitable coating apparatus by the dipping or reeling method, these layers being produced from the following solutions:

*1st Layer*

20 g. of a copolymer containing 60 percent by weight of vinyl chloride and 40 percent by weight of vinyl acetate,
3 g. of nitrocellulose (nitrogen content 12.1%),
300 cc. of chloroform,
700 cc. of ethyl acetate.

2nd Layer 15 g. of nitrocellulose,
250 cc. of butyl acetate,
150 cc. of ethyl acetate,
600 cc. of ethanol.

3rd Layer 10 g. of gelatin,
1.6 g. of phthalic acid or salicylic acid,
0.7 g. of glyoxal,
60 cc. of water,
50 cc. of butyl acetate,
890 cc. of methanol.

After being thoroughly dried, a clear film is obtained which is coated with a silver halide gelatin emulsion and if required also an antihalation layer. The adhesion of the layers is sufficient, even in photographic baths.

The alteration in length of the film at 20° C. and 60 percent relative humidity is 0.01 to 0.03 percent after soaking in water for 16 hours (that of a cellulose triacetate film is 0.4 to 0.6 percent).

EXAMPLE 2

A film with a thickness of 0.14 mm. and produced as in Example 1 is treated on one side with the following solution:

1 g. of polyvinyl alcohol mixed acetal of polyvinyl alcohol, benzaldehyde and sodium salt of benzaldehyde-2,4-disulphonic acid, used in the molar ratio of 3:1; degree of acetalization, 57.3 percent.
20 cc. of methanol,
10 cc. of dimethyl formamide,
70 cc. of methylene chloride,
0.3 g. of a saponification product of a copolymer of vinyl chloride and vinyl acetate (1:1 by weight). The saponification products contain 65.7 percent by weight of vinyl chloride, 22.7 percent by weight of vinyl alcohol, 11.6 percent by weight of vinyl acetate.

The second side can be provided with one of the antistatic layers customary for cinematographic film if required also with a lubricant. The film thus obtained has the following mechanical values:

|  | Breaking load, kg./sq. mm. | Elongation (percent) | Impact strength, cm. kg./cc. |
|---|---|---|---|
|  | 8.8 | 120 | 800 |
| Cellulose acetate film | 9.0 | 35 | 350 |

It can be coated with a cinematograph silver halide positive emulsion the binding agent of which is gelatin. The film has the same endurance in a projector as an acetyl cellulose film.

EXAMPLE 3

100 kg. of 4,4' - dihydroxydiphenyl - methylethyl-methane-polycarbonate are dissolved in a mixture of 350 cc. of methylene chloride and 20 kg. of butyl acetate, with addition of 5 kg. of phthalic dibutyl ester, and is cast to form a foil with a thickness of 0.2 mm. This foil is stretched to 1.8 times its length at 80° C. on a stretching machine and thereafter transversely to 1.5 times its width. The foil is thereafter further treated according to Example 2.

The film has the following mechanical data in the longitudinal direction:

| Breaking load, (kg). | Elongation (percent) | Impact strength, cm. kg./cc. |
|---|---|---|
| 15 | 30 | 400 |

After being coated with a cinematographic positive emulsion, the endurance of the film in a projector is increased by approximately 30 percent.

EXAMPLE 4

Two layers are applied to both sides of a foil as in Example 1, the layers consisting of the following solutions:

1st Layer

4% of nitrocellulose,
2% of epoxide resin (reaction product of epichlorohydrin and 4,4'-dihydroxy-diphenyldimethyl methane containing 0.05 mol of epoxide and 0.36 mol of hydroxyl per 100 g. of resin. Suitable products are also the resins which are obtained on the market under the trade name "Epikote.").
94% of ethyl acetate.

2nd Layer 2.3% of gelatin,
22.7% of acetic acid,
75.0% of methyl alcohol.

The light-sensitive silver halide gelatin layer and a suitable backing layer are then applied by casting.

According to the example, a film is also obtained which has excellent dimensional stability with good bonding of the layers.

EXAMPLE 5

Three layers are applied to both sides of a foil as in Example 1, the said layers being produced by the following solutions:

1st Layer

2% of nitrocellulose,
2% of epoxide resin (as disclosed in Example 4),
96% of ethyl acetate.

2nd Layer

2% of nitrocellulose,
68% of ethyl acetate,
30% of methyl alcohol.

3rd Layer 2.3% of gelatin,
22.7% of acetic acid,,
75.0% of methyl alcohol.

The film obtained after the necessary photographic layers had been applied, corresponds to that obtained according to Example 1 as regards its properties.

EXAMPLE 6

Three layers of the following solutions are applied to both sides of a foil as in Example 1:

1st Layer

2% of polycarbonic acid ester of 2,2-(4,4'-dihydroxydiphenyl)-pentane (K-value, 45),
2% of nitrocellulose,
96% of ethyl acetate.

2nd Layer

2% of nitrocellulose,
68% of ethyl acetate,
30% of methyl alcohol.

3rd Layer 2.3% of gelatin,
22.7% of acetic acid,
75.0% of methyl alcohol.

In this case as well after application of the necessary photographic layers, a film is produced with good bonding of the layers and excellent maintenance of dimensions.

EXAMPLE 7

A film produced by the process of Example 1 is treated with the following subbing solution:

9 g. of gelatin,
19 cc. of ethylenechlorohydrin (2 chloroethanol),
30 cc. of phthalic acid (10% methanolic solution),
100 cc. of acetone,
75 cc. of 1% methanolic solution of glyoxal,
450 cc. of methylene chloride,
150 cc. of methanol,
100 cc. of tetrachloroethane,
75 cc. of a 10% solution in acetone of a copolymer of 1 part by weight of vinyl chloride and 1 part by weight of vinyl acetate, which is saponified to a normally solid film-forming product of the following composition: 65.7 parts by weight of vinyl chloride, 22.7% of vinyl alcohol, 11.6 percent by weight of vinyl acetate.

On this pretreated film there is coated a customary photographic silver halide gelatin emulsion. In the above examples instead of silver halide gelatin layers also other layers may be applied, the binding agent of which comprises or consists of other customary natural or synthetic binding agents, such as polyvinyl alcohol, partially hydrolyzed polyvinyl acetate, polyvinylpyrrolidone. Instead of silver halides there may also be used other light-sensitive substances such as diazo compounds.

The subbing layers disclosed above are characterized in that they contain (1) a normally solid film-forming agent which adheres firmly to the polycarbonate support and (2) a normally solid film-forming agent which adheres firmly to a gelatin layer coated on said subbing layer. The film-forming agent (1) contains polar groups, such as halide groups and is only slightly swellable in water (when swollen in water it takes up not more than about 10%, preferably not more than 0.5 to 3% by weight, of water), whereas the film-forming agent (2) is easily swellable in water (it takes up at least 100 percent by weight of water, when swollen in water). In case that these two types of film-forming agents are incorporated in a single subbing layer, they are so selected that they are soluble in the same solvents and that they do not affect each other as regards their capacity to adhere either to the polycarbonate support or to the gelatin layer coated on the subbing layer. The subbing layers may have a thickness of about 0.5 to 3, preferably 1 to 2 microns.

As regards the polycarbonate film supports of the present invention, these are produced in a thickness of about 0.08 to 0.2 mm. As already pointed out above, the present polycarbonates are compatible with such plasticizers which are soluble in methylene chloride, such as esters of phosporic acid (triphenyl phosphate, tricresyl phosphate, and trichloroethyl phosphate), esters of phthalic acid with monohydric and polyhydric alcohols (dimethyl phthalate, diethyl phthalate, and dibutyl phthalate), polycondensates of phthalic acid with dihydric alcohols (glycol, 1,2-dihydroxypropane) having an acid number below 20 and a hydroxyl number between about 120 and 360 (corresponding to a hydroxyl content between about 3.8 and 11 percent by weight), esters of adipic acid with monohydric alcohols (butyl adipate, benzyl butyl adipate, ethyl adipate), esters of alkylsulphonic acids with aromatic hydroxy compounds (phenol, cresol), the alkyl group having 12 to 18 carbon atoms. The aforementioned polycondensates of phthalic acid and saturated dihydric aliphatic alcohols are obtained by heating 1 mol of phthalic anhydride with at least two moles of dihydric alcohol at temperatures of about 180 to 200° C. to produce the corresponding diester of phthalic acid and thereafter continuing heating under vacuum at about 130 to 140° C. until the reaction product has the aforementioned hydroxyl numbers. Contrary to expectation it has been found that the elasticity modulus of the present polycarbonate foils is increased by incorporating therein about 1 to 10 percent by weight of the recited plasticizers of which the polycondensates of phthalic acid and dihydric alcohols have proved especially valuable.

Of special value are photographic film supports of high molecular weight mixed polycarbonates of (1) a 4,4'-dihydroxydiphenylalkane, preferably 4,4' - dihydroxy - diphenyldimethylmethane, and of (2) a 4,4'-dihydroxydiphenylcyclohexane, preferably 4,4'-dihydroxydiphenyl-1,1-cyclohexane, said mixed polycarbonates having said two types of dihydric phenols incorporated in relative proportion of 1 to 20, preferably 1 to 10 parts by weight of component (2) and of 80 to 99, preferably 90 to 99 parts by weight of component (1).

As regards the mixed acetals which may be used for the production of the subbing layer there come into consideration compounds which are composed of units of the following general formulae:

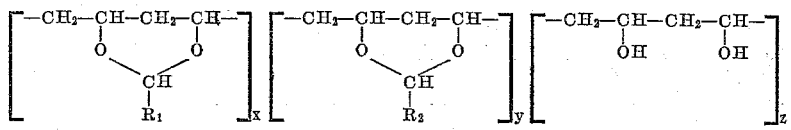

wherein $R_1$ represents an alkyl, aryl, aralkyl or cycloalkyl group substituted by one or more water-solubilizing groups, more especially neutralized sulpho groups and, if desired, by further substituents; and $R_2$ represents an alkyl, aryl, aralkyl or cycloalkyl group which may be substituted, but not by water solubilizing groups;

the ratio between $x$, $y$ and $z$ depends on the constitution of $R_1$ and $R_2$ and is so chosen that the products are soluble in organic solvents, more especially methanol, but are only swellable in cold water.

The general formula is further explained by the formula given below for a number of characteristic compounds of this nature:

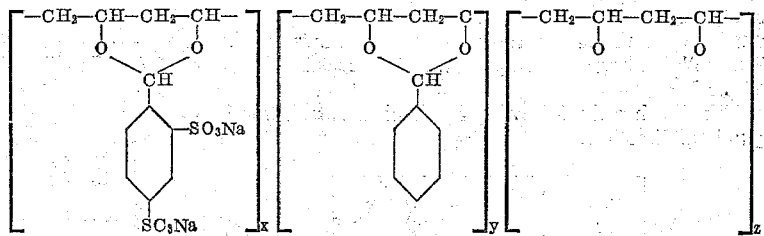

|  | Percent |
|---|---|
| Benzaldehyde disulphonate acetal | 32–36 |
| Benzaldehyde acetal | 34–38 |
| Vinyl alcohol | 26–34 |

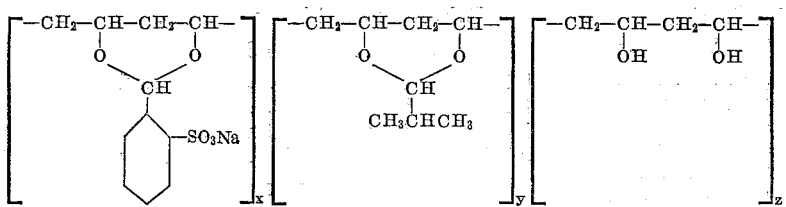

|                                  | Percent |
|----------------------------------|---------|
| Benzaldehyde monosulphate acetal | 45–49   |
| Butyraldehyde acetal             | 22–26   |
| Vinyl alcohol                    | 25–33   |

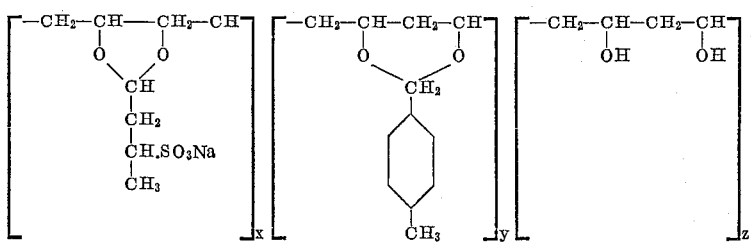

|                              | Percent |
|------------------------------|---------|
| Butyraldehyde sulphonate acetal | 37–41 |
| Tolyl aldehyde acetal         | 29–33   |
| Vinyl alcohol                 | 26–34   |

This application is a continuation-in-part of our United States patent application Serial No. 577,362, filed April 10, 1956, now abandoned.

In the drawing:

FIGURE 1 is a fragmentary section of a photographic material consisting of a polycarbonate support 1, a subbing layer 2 coated on said support and a silver halide gelatin emulsion layer 3 coated on said subbing layer.

What we claim is:

1. A photographic film element comprising a film base formed of a high-molecular-weight poly(di(monohydroxyaryl)alkane carbonate) supporting a silver halide gelatin emulsion layer that is bonded to the said film base by an interposed subbing layer formed of a composition of the group consisting of (a) compositions comprising (1) gelatin and (2) partially hydrolyzed copolymers of vinyl chloride and vinyl acetate containing between about 45 and about 70 percent by weight of copolymerized vinyl chloride, between about 10 and about 40 percent by weight of copolymerized vinyl acetate, and between about 5 and about 30 percent by weighth of copolymerized vinyl alcohol, the said partially hydrolyzed copolymers being present in amounts between about 3 to about 15 parts by weight to each 10 parts by weight of gelatin which composition had been applied to the base film at a pH between 2 and 5, and (b) compositions comprising mixtures of (1) mixed acetals of polyvinyl alcohols of which between 50 and 70% or the hydroxyl groups are acetalized with mixtures of at least two aldehydes, one of which is an aromatic aldehyde, the aromatic nucleus of which contains a substituent of the group consisting of carboxy and sulfo radicals, the amount of the aromatic aldehyde being between 20 and 50 mol percent of the total mixture of aldehydes, and (2) partially saponified copolymers of vinyl chloride and esters of vinyl alcohol and carboxylic acids which contain between 10 and 40 percent by weight of copolymerized vinyl chloride, between 45 and 70 percent by weight of copolymerized vinyl alcohol and between 5 and 30 percent by weight of copolymerized esters of vinyl alcohol and carboxylic acids, said percents by weight totalling 100 percent by weight, the said mixtures containing between about 0.2 to about 1 part by weight of the partially saponified copolymer to each part by weight of the acetal.

2. A photographic film element as defined in claim 1 in which the interposed subbing layer is formed of a composition comprising a mixture of (1) a partially saponified copolymer of vinyl chloride and an ester of vinyl alcohol and a carboxylic acid, and (2) a mixed acetal of a polyvinyl alcohol and a mixture of aldehydes consisting of (I) and aldehyde and (II) a sulfo-substituted aromatic aldehyde, the molecular proportion of the sulfo-substituted aromatic aldehyde in the said mixture not exceeding that of the other aldehyde, in which mixed acetal between 50 and 70 percent of the hydroxyl radicals of the polyvinyl alcohol has been acetalized, both components of the subbing layer being present in a proportion within the range specified in claim 1.

3. A photographic film element as defined in claim 2 in which the mixed acetal component of the subbing layer is a mixed acetal of a polyvinyl alcohol and a mixture of aldehydes consisting of (1) an aldehyde and (2) a sulfo-substituted benzaldehyde.

4. A photographic film element as defined in claim 2 in which the mixed acetal component of the subbing layer is a mixed acetal of a polyvinvl alcohol and a mixture of aldehydes consisting of (1) an aromatic aldehyde of the benzene series and (2) an alkali-metal salt of a benzaldehyde disulfonic acid.

5. A photographic film element as defined in claim 1 in which the film base consists essentially of a high molecular weight poly(di(monohydroxyaryl) alkane carbonate) and between 1 and 10 percent by weight of a plasticizer that is compatible therewith.

6. A photographic film element as defined in claim 5 the film base of which consists essentially of a high-molecular weight poly(bis(monohydroxyaryl)alkane carbonate) containing between 1 and 10 percent by weight of a plasticizer of the group consisting of esters of phosphoric acid, phthalic acid, adipic acid, and alkylsulfonic acids containing between 12 and 18 carbon atoms.

7. A photographic film element as defined in claim 6 in which the plasticizer is an ester of phthalic acid and a saturated dihydric aliphatic alcohol having an acid number below 20 and a hydroxyl number between 120 and about 360.

8. A photographic film element as defined in claim 1 in which the film base consists essentially of a high molecular weight mixed polycarbonate resin comprising between 80 and 99 parts by weight of a poly(4,4'-di(monohydroxyphenyl)alkane carbonate) and between 1 and 20 parts by weight of a poly(4,4'-di(monohydroxyphenyl)cycloalkane carbonate), the said film base having a thickness between 0.08 and 0.2 millimeter.

9. A photographc film element as defined in claim 7 in which the poly(4,4' - di(monohydroxyphenyl)alkane carbonate) is poly(4,4-(hydroxphenyl)propane carbonate) and the poly(4,4'-di(monohydroxyphenylcycloalkane carbonate) is poly(4,4'-di(monohydroxyphenyl)-1,1-cyclohexane carbonate).

10. A photographic film element as defined in claim 7 in which the mixed polycarbonate resin contains between about 90 and 99 parts by weight of poly(4,4'-di(monohydroxyphenyl)propane carbonate) and between about 1 and 10 parts by weight of poly(4,4'-di(monohydroxyphenyl)-1,1-cyclohexane carbonate).

References Cited in the file of this patent

UNITED STATES PATENTS

| | | |
|---|---|---|
| 2,133,110 | Nadeau | Oct. 11, 1938 |
| 2,462,151 | Woodward | Feb. 22, 1949 |
| 2,874,046 | Klockgether et al. | Feb. 17, 1959 |
| 2,997,459 | Schnell et al. | Aug. 22, 1961 |

FOREIGN PATENTS

| | | |
|---|---|---|
| 532,543 | Belgium | Oct. 30, 1954 |